United States Patent [19]

Blount et al.

[11] Patent Number: 4,604,709
[45] Date of Patent: Aug. 5, 1986

[54] CHANNEL COMMUNICATOR

[75] Inventors: Frederick T. Blount, Hopewell Junction; Robert S. Capowski, Verbank; Daniel F. Casper, Poughkeepsie; Lawrence R. DelSonno, Beacon; Robert F. Geller, Wappingers Falls, all of N.Y.; Joseph M. Kusmiss, El Paso, Tex.; Terrence K. Zimmerman, Red Hook, N.Y.

[73] Assignee: International Business Machines Corp., Armonk, N.Y.

[21] Appl. No.: 465,952

[22] Filed: Feb. 14, 1983

[51] Int. Cl.⁴ .................. G06F 13/14; G06F 13/38
[52] U.S. Cl. .................................................. 364/900
[58] Field of Search ... 364/200 MS File, 900 MS File; 340/825.03; 370/61

[56] References Cited

U.S. PATENT DOCUMENTS

| | | | |
|---|---|---|---|
| 3,693,161 | 9/1972 | Price et al. | 364/200 |
| 4,020,466 | 4/1977 | Cordi et al. | 364/200 |
| 4,056,843 | 11/1977 | Bishop et al. | 364/200 |
| 4,115,854 | 9/1978 | Capowski et al. | 364/200 |
| 4,133,030 | 1/1979 | Huettner et al. | 364/200 |
| 4,156,932 | 5/1979 | Robinson et al. | 364/200 |
| 4,298,959 | 11/1981 | Sundermeyer et al. | 364/900 |
| 4,426,679 | 1/1984 | Yu et al. | 364/200 |
| 4,437,157 | 3/1984 | Witalka et al. | 364/200 |

Primary Examiner—James D. Thomas
Assistant Examiner—Thomas Lee
Attorney, Agent, or Firm—W. S. Robertson

[57] ABSTRACT

A channel communicator CC has a storage array for holding an entry for each channel and for holding a busy vector and an interrupt vector that each have a bit for each channel. The CC is connected between the input bus and the output bus that connect the channels and an I/O processor IOP to processor main store. A message to the CC includes the ID of the channel that the message is to or from and the CC uses this ID as an address for accessing a channel entry or a bit in a vector. The message also carries a command that controls the CC to store a data portion of a message or to fetch a channel entry or a vector from the array and load it onto the output bus addressed to the IOP or to one of the channels. The command also controls addressing a particular one of the vectors. The CC also has means responsive to a command to perform a sequence of operations for testing the vectors and for testing fields of an entry in the array and for using the results of the test to control the execution of the command.

10 Claims, 7 Drawing Figures

CHANNEL COMMUNICATOR

FIELD OF THE INVENTION

This invention relates generally to data processing apparatus and more specifically to components of the channel subsystem of a data processing system.

RELATED APPLICATIONS

This application is related to an application entitled "Priority Circuit for Channel Subsystem Having Components with Diverse and Changing Requirement For System Resources" by R. S. Capowski et al., Ser. No. 465,953 filed on the same day as this application.

BACKGROUND TO THE INVENTION

Although a channel subsystem is a conventional part of a data processing system and is well known, it will be helpful to review the features and the terminology that particularly apply to this invention. In a simple system, a single computing engine might execute a sequence of instructions that partly use only the resources of the central processor and that partly directly control the resources and the operations of the I/O subsystem. In a system of the type that will use this invention, a central processing engine performs only some of the I/O operations, and several computing engines or processors handle different parts of the I/O operation. One of these processors is called an I/O processor or IOP and there are several processors that are called channel processors or CP's. The CP's handle the actual data transfers into and out of processor memory and they execute commands by forming orders that are sent to the I/O device controllers. The IOP handles general parts of the I/O operation such as communicating with the central processor, scheduling the I/O jobs, and it communicates with the central processor for operations such as getting control blocks that have been prepared by the central processor and reporting status conditions that are handled by the central processor instead of by the IOP.

The IOP and the CP's also communicate with each other, and this invention provides an improvement in these communications. The IOP signals a particular CP when an I/O job is to be performed and the CP signals the IOP when the job has been completed and whenever some other general operation is to be performed by the IOP. In the known prior art, these communications are carried out over signal wires that run between the IOP and the CP's or over the existing data paths that connect the IOP and the CP's to processor storage.

OBJECTS OF THE INVENTION

A general object of this invention is to provide a data processing system having a large number of channels, for example 64 channels. With a large number of channels, there is a high rate of data transfer between processor memory and the I/O subsystem, and one object of the invention is to reduce other traffic between processor memory and the I/O subsystem, specifically the communications between the IOP and the CP's. Stated from a different standpoint, the system of this invention is arranged to handle more channels than a system in which the memory bus is also used for communications between the IOP and the CP's or between CP's. A general object of this invention is to provide buffers where they will keep the processor memory bus fully used and then to route other messages between the IOP and the CP's without adding to the load on the memory bus.

SUMMARY OF THE INVENTION

In the system that will be described, the CP's are connected to the central processor memory through a series of buffer memory stages that are arranged in a funnel shape between the numerous narrow busses of the CP's and the single wide bus of the central processor memory system. The uppermost stage of buffers and associated apparatus will be called the primary data stager or PDS and in the immediately next lower stage there are two units called secondary data stagers (SDS). The PDS also provides the connection between the IOP and central processor memory.

The system of this invention provides a Channel Communicator or CC for communications between the IOP and the CP's. The array has a word location for each CP. The IOP or a CP accesses the array by means of a message in a predefined format that includes a generalized data section (preferably three bytes) a section of predefined fields (preferably two bytes) and a control information section (preferably two bytes). The control section contains a field that identifies the CP that the message is from or is addressed to. The array includes logic circuits for addressing the array according to the CP identification field so that a particular word location of the array is used for communicating between the IOP and a particular CP in either direction.

The message control field also has a byte that signifies one of several communications options that are useful in this system. The array has logic circuits that decode these bits and operate the memory through one or more fetch and/or store cycles on the array with selected non-array operations to perform the operation. The array operations include several selective bit setting operations. The non-array operations include, signalling a channel and also include several bit testing operations. These operations and the associated components of the array will be summarized and then described in detail later in this specification.

THE DRAWING

THE PREFERRED SYSTEM

1. Introduction

Section 2 is a glossary of some of the terms that are used in this specification. Section 3 of this specification and FIG. 1 explain the general features of our preferred system. Section 4 and FIG. 2A describe a primitive read operation and explain the format of the communications message that is transferred between the components of the I/O subsystem and introduce some of the conventional components of the CCA. Section 5 and FIG. 2B complete the explanation of the conventional features of the array and explain the primitive write operation, which is closely similar to a conventional memory write operation. Sections 6 through 8 and FIGS. 2C and 2D present other components of the system in terms of how they control the flow of information within the CCA and between the CCA and the IOP and the SDS's. Sections 9 and 10 describe the hardware that performs these primative operations and the associated CCA operations. Sections 11 and 12, describe the operations that are made up of one or a few primative operations.

2. Terminology

The Channel Communicator or CCA includes a conventional memory or data store that includes a conventional array of storage cells and conventional addressing circuits for accessing a unit of data. The memory will be called the Channel Communicator Array (CCA). The memory accessing operations will be called read and write or fetch and store. The unit of data that is accessed in a memory store or fetch operation will be called a memory word. The memory has an input register and an output register that will be called the CCIR and CCOR (for channel communications input register and channel communications output register). A memory word will be called a "channel entry" or a "vector", depending on its use. A channel entry has a data field and control fields. The data field of the channel entry has a "channel command" field that is to be distinguished from the CCA command of the CCIR. The contents of the data field are not otherwise significant to the invention, and the term "data" is used to show this generalization. The invention will be described partly in terms of "primative operations" (such as read) that are combined to produce more complex operations, called CCA operations, that are defined in the commands that are sent to the CCA. To simplify the terminology, specific values of register sizes and specific logic variables will be used in the following description.

3. The CC and the Associated System—FIG. 1

Figure 1:
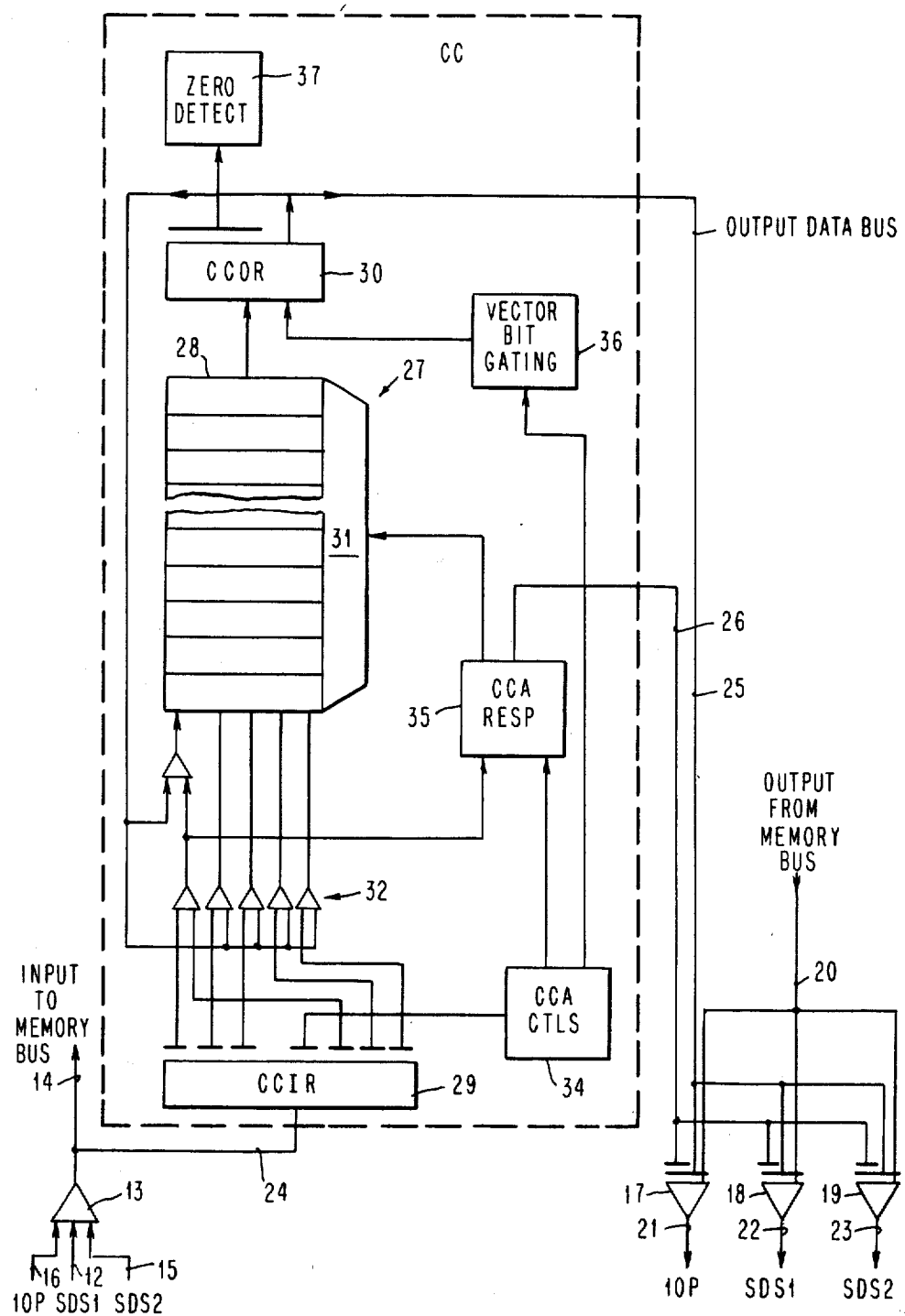
FIG. 1 is a block diagram of the channel connections to elements that use the array.

The CC is part of the PDS, and FIG. 1 shows components of the PDS that interconnect processor main storage with the IOP and SDS 1 and 2. The IOP and SDS's also use these paths for communications through the CCA.

Some of the CP's are connected to the PDS through SDS 1, and the input from SDS 1 to the PDS on a line 12 is connected through a switching circuit 13 to an input bus 14 that leads to the controller for main storage. Circuit 13 similarly makes a connection to input bus 14 from bus 15 from SDS 2 and from bus 16 from the IOP. Similarly, switching circuits 17, 18 and 19 are connected to couple an output bus 20 from main memory to individual output busses 21, 22 and 23 to the IOP and to SDS 1 and 2.

The CC is connected between input bus 14 and output busses 21, 22 and 23 and it receives messages on a branch 24 of the input bus and provides an output on a branch 25 through switching circuits 16, 17 and 18 to output busses 20, 21 and 22. These busses are all the same width, preferably eight bytes except bus 25 which is 5 bytes wide. The CC has an additional bus 26 that is two bytes wide which will be described later.

In the schematic of FIG. 1, switching circuit 13 is shown as a funnel shaped functional block. As is conventional, this functional block is implemented by an array of AND and OR gates. The AND gate array has the dimensions of the number of bits on the bus (sixty-four) and the number (three) of the busses is 12, 15, 16 that may be connected into a single bus. There is an OR gate for each bit position of bus 14 and and each OR gate connects the corresponding AND gates to a line of bus 14. Circuits of this type are widely used and are well known.

The CCA comprises a memory 27 that includes an array 28, CCA, an input register 29 CCIR, and output register 30 CCOR, and an address decoder 31. The CCIR is connected to receive a message from input bus 24, and output register 30 is connected to supply an output to the output busses through branch 25. The connections through block 13 are controlled by a priority system that is described in the application of Capowski and Zimmerman. Their system grants access to the CCIR 29 (or to other components not shown here) and it stores the identification of the IOP, SDS 1 or SDS 2, that is granted access. In some operations to read the CCA, this stored identification is used for directing the contents of register 30 through the appropriate one of switching circuits 16, 17 or 18. The input register is the same width as the other busses that have been described so far, preferably eight bytes. The array and its output register are narrower, preferably five bytes, and predetermined byte positions of the output bus are unused or undefined for CCA operations. A set of gates 32 transmits selected fields of the CCIR or CCOR to the CCA or to other components of the CC. FIG. 1 also shows components 34-37 and their interconnecting lines, and they will be described in detail later.

4. Primitive Operations-Read—FIG. 2A

Figure 2A:
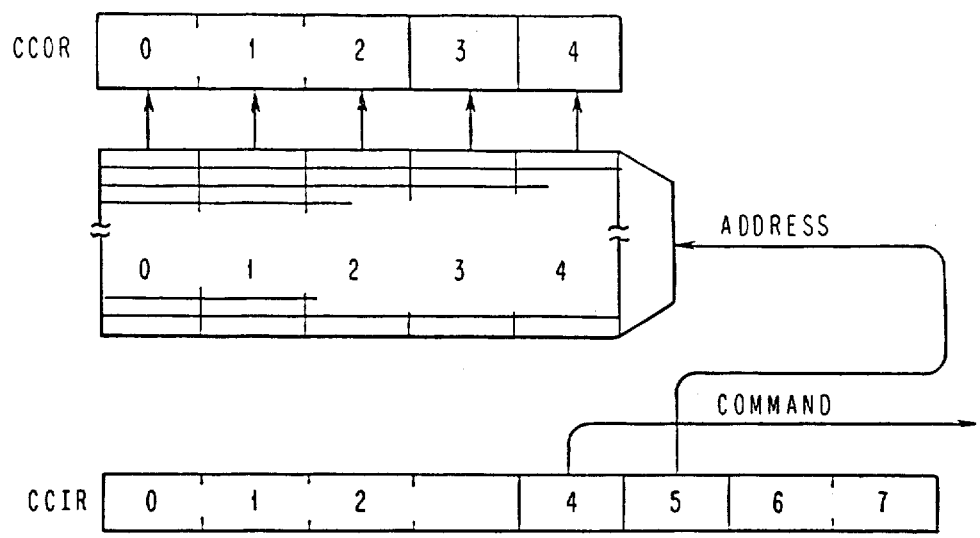
FIGS. 2A through 2D are diagrams showing the format of the message that is transmitted through the channel communications array and the flow of data and commands for several primitive operations.
Figure 2B:
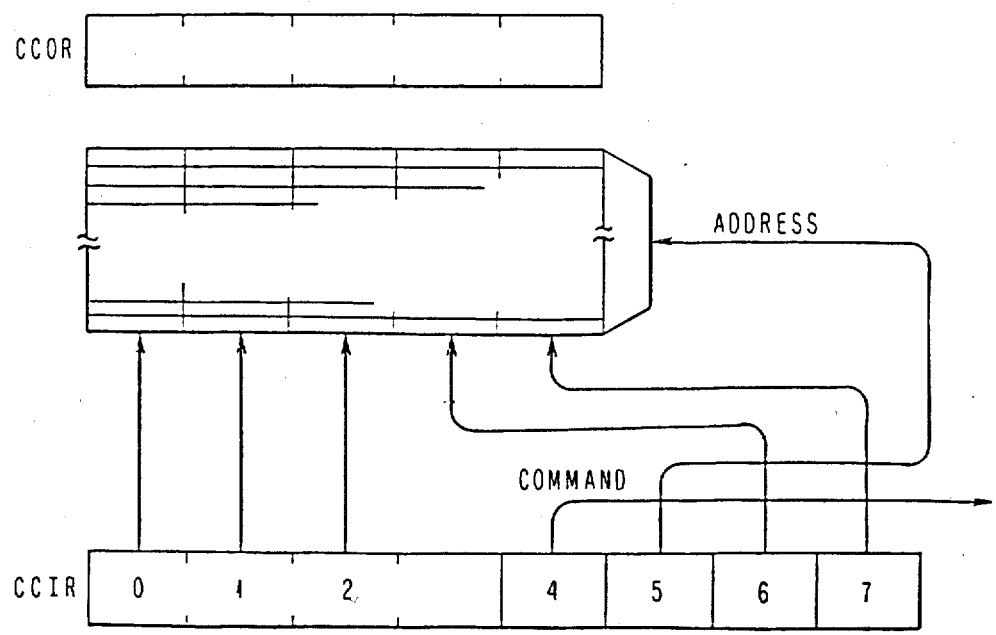
Figure 2C:
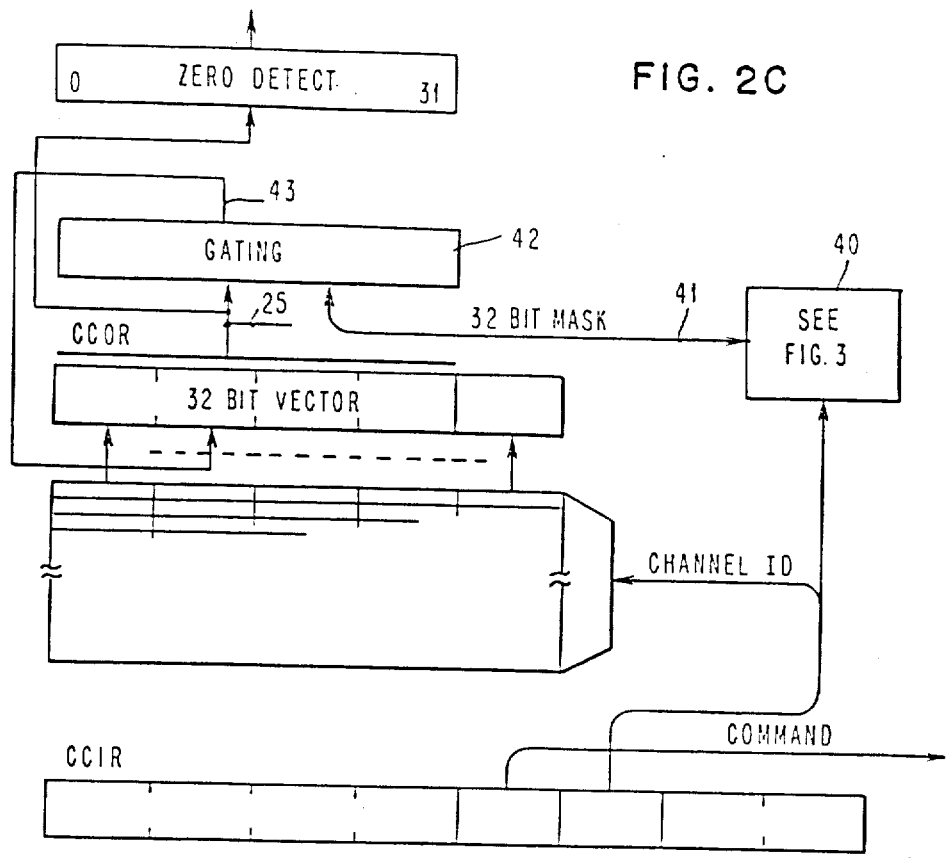
Figure 2D:
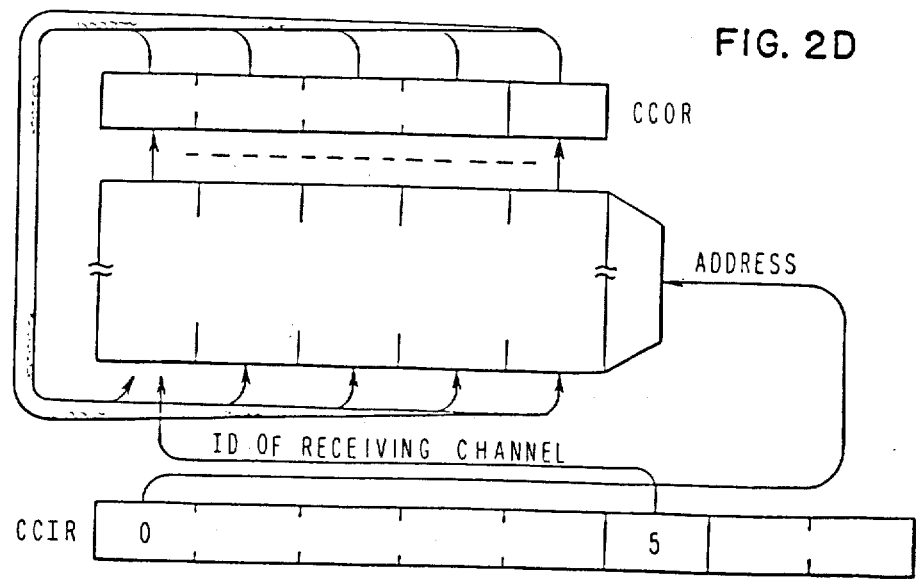

Some array words are Channel entries and some are vectors. FIG. 2A shows all of the bytes of the CCA message in the CCIR or the CCOR as the bytes are significant in the primitive read operation on a channel entry. The simpler data form for a vector will be described later in this section. The relation between Channel Entry and Vectors in the CCA will be described later in the discussion of FIG. 4.

The CCIR is three bytes longer than the array and the CCOR. Byte positions 0 to 4 of the CCOR originate in byte positions 0 to 4 of the array on a Read Operation. Byte positions 0 to 2 of the array originate in byte positions 0 to 2 of the CCIR on a Write Operation. Byte positions 3 and 4 of the array originate in byte positions 6 and 7 of CCIR on a Write Operation.

In a Channel Entry bytes 0 to 3 of the array and the CCOR are a data field. (Bytes 0 to 3 of the CCIR are not significant in a primitive read operation and are not shown in FIG. 2A.) This field is called "data" to signify that it can be given specific bit significance in a wide variety of ways that in general are not significant to this invention.

Bytes 3 and 4 of the array and the CCOR are used as data fields for transferring information between the IOP and the CP's, specifically for transmitting status to the IOP or for transferring an instruction from the IOP to a CP (CCOR byte 3) or for transmitting a unit address in either direction (CCOR byte 4). (A unit address is conventionally combined with the Channel ID to uniquely identify a subchannel.)

Byte 4 of the CCIR word is a CCA command byte that tells the CCA to perform one of the CCA operations that will be described later. In the example, the CCA operation requires the execution of a primitive read operation. Byte 5 of the CCIR word is the Channel ID and in this example it identifies either a channel that is reading an entry in the array or a channel entry that the IOP is reading. Each CP has one entry in the array for communication in either direction, and the channel ID is used as a memory address (as described in detail in section 5) for the primitive read operation and for other memory accessing operations. (Other uses are described later.)

The address for the read operation is transferred from byte 5 of the CCIR to the address circuits of the array, and the channel entry that is read from the array is transferred to the 30 corresponding positions of the CCOR and onto the bus. The gates are controlled to transfer the information on the bus to the IOP or to the requesting channel. (Access to the CCIR is controlled by the circuit of Capowski, et al. The ouput on the read operation is transferred through the corresponding one of gates 17, 18, 19 of FIG. 1. Thus, the primitive read operation is conventional except for the significance of the data fields.

5. Primitive Operations: Unconditional Write—FIG. 2B

The primitive write operation is conventional except that there is a transposition of byte positions between the input register CCIR and the memory storage byte positions. As in FIG. 2A, byte positions 4 and 5 of the CCIR are used to control the operation. The three data byte positions of the input word are in the same positions of the CCIR as the data is shown in FIG. 2A. Bytes 4 and 5 of the array and CCOR however originate in byte positions 6 and 7 of the CCIR, and there is a simple transposition of these positions when a message is stored in the array.

6. Primitive Operations: Set/Reset after Read (Vector Operations)—FIG. 2C

FIG. 2C illustrates the flow of data for the primitive operation of changing predefined bits of a memory word after a primitive read operation that loads the word into the CCOR. In the data flow of FIG. 2C, bytes 4 and 5 of the CCIR hold the CCA command and the Channel ID for the preceeding read operation, as in FIG. 2A, but byte 5 is also supplied to a circuit 40 that forms a thirty two bit mask on a bus 41. The thirty two bit data field of the CCOR and the thirty two bit mask from circuit 40 are transferred to a gating circuit 42 that produces a thirty-two bit output on a bus 43 which feeds back to CCOR.

This data path is used for setting a vector bit to a 1 or resetting it to a 0. The channel ID is decoded to identify the bit position in the way already described. The addressed bit is set to a 1 or a 0 and the other bits of the vector are unchanged.

7. Other Bit Operations

In one primitive operation, byte 3 is tested for a non-zero bit in a channel entry.

8. Primitive Operations: Signal Channel—FIG. 1

Bus 26 is two bytes wide and carries a one byte identification of a channel and a 1 byte code that signifies in these operations that an operation in the CC has been performed. Each channel has means to read its address and to interpret the code. These components are conventional in analogous operations and will be readily understood.

9. CCA Addressing—FIG. 3

Figure 3:
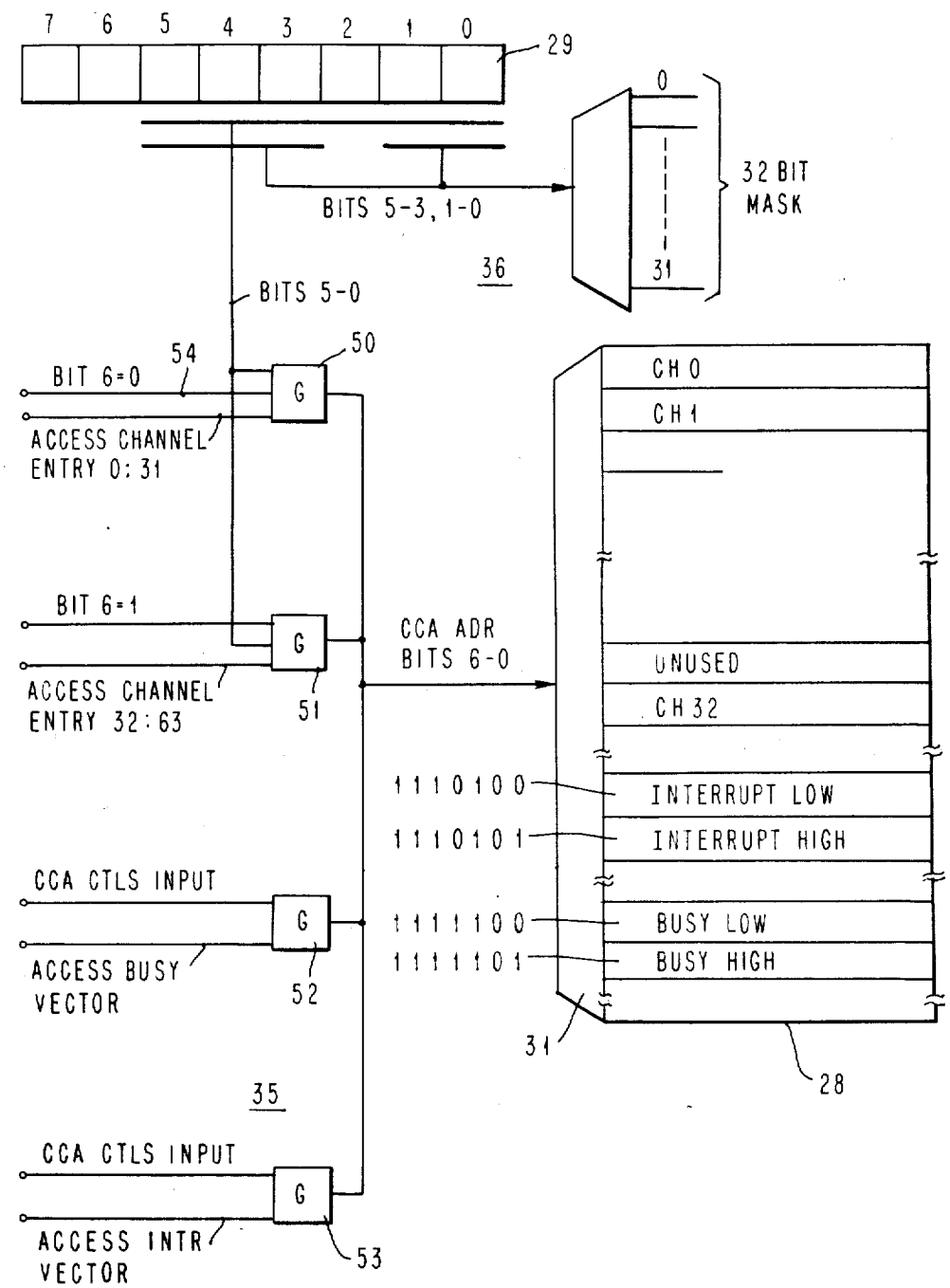
FIG. 3 is a block diagram showing the addressing circuit for the CCA.

FIG. 3 shows the memory array and byte 5 of the CCIR word which have both been introduced already and the interconnections to byte 5 of the CCIR and to other sources of the address bits and control bits. The memory is illustrated as having 128 word locations which requires an address of seven bits. Six of these bits are from bits 5—0 of the channel ID byte which uniquely identify the 32 channels and their entries in the CCA. Bit 2 of FIG. 3 is a constant 0 resulting in channel entries which are not contiguous in the CCA memory array. A seventh address bit (bit 6 of the address) is a 0 for addressing the channel entries in the top half of the array and a 1 for channel entries in the bottom half of the array. Bit 6 is formed from logic circuits as will be described (or equivalently is formed by the IOP or SDS and loaded into a bit position of the address). Four locations in the bottom half of the CCA array are used for the two vectors, which are stored as four half vectors. The four half vectors locations are 111 0100 to 111 0101 and 111 1100 to 111 1101 (decimal 116, 117, 124, 125). In the 128 word array, 60 word locations are not used.

The drawing shows four gates 50, 51, 52 and 53 that provide the appropriate address bits for accessing a channel entry, the interrupt vector or the busy vector. A gate comprises an AND gate for each address bit and the appropriate enabling signal. Gate 50 forms a six bit address in the range 00 0000 to 11 1011 for addressing 1 of 32 channel entries. Address bit 2 of FIG. 3 is a constant zero. When address bit 6 which is supplied on line 54 is a 0, the 32 channels in the top half of the CCA array are accessed. Similarly, gate 51 forms the CCA addressing for the 32 channel entries in the bottom half of the CCA array.

The 64 bit vectors are each stored as two half vectors of thirty two bits each. The first or low half of each vector has bits for channels 0–31 (decimal). A second or high half vector has bits for channels 32-63 (decimal). For interrupt or busy vector accesses the address bits 5—0 are formed in CCA CTLS (FIG. 1 circuit 34) and are based upon the command in CCIR byte 4. Address bit 0 is determined by whether the vector access was requested by the IOP, SDS 0 or SDS 1. If SDS 0 requests an interrupt or busy vector access, address bit 1 is a 0. If SDS 1 requests a vector access address bit 0 is a 1. In the case of the IOP, address bit 0 is passed unchanged. Gates 52 and 53 show the address circuits for the interrupt vector and the busy vector, respectively. Gate 52 of FIG. 3 is an AND gate and is the and to the address bits and an enable line from the CCA CTLS. For the interrupt vector, the addresses generated are 111 0100 binary for the low and 111 0101 for the high interrupt vector. Similarly, for the busy vector (gate 53) the addresses are 111 1100 binary for the low and 111 1101 for the high busy vectors.

The command in byte 4 of the CCIR word can be decoded into half vector primitive operations that require access to a unique bit position in the half vector corresponding to a particular channel entry. As explained previously, it is the decode of the CCIR command byte 4 which points to a specific half vector location through the circuits in the CCA CTLS shown in FIG. 1, circuit 35. After the half vector (interrupt or busy) has been placed in CCOR, five additional address bits are required to form 1 of 32 vector masks that is required to select a unique vector bit position. As shown in FIG. 3, circuit 36, CCIR byte 5 bits 5—3 and 1—0 of the Channel ID are used as the 5 address bits to form the vector mask. CCIR byte 5 bit 2 is a constant 0. As an example, consider a test to see whether channel 35 is busy. The CCIR command byte 4 describes the primitive vector operation and points to the half vector location in the CCA memory array. In this example, the high busy vector location is selected. The Channel ID field of CCIR byte 5 bits 5−3 and 1−0 are 000 and 11 which form the busy vector mask and select the fourth bit position (of the normal binary counting sequence 000 00 to 111 11) of the high half busy vector. In this case the fourth bit position is the "Busy Bit" corresponding to channel 35.

10. Implementation: CCA Command Decode Circuit—FIG. 4

Figure 4:
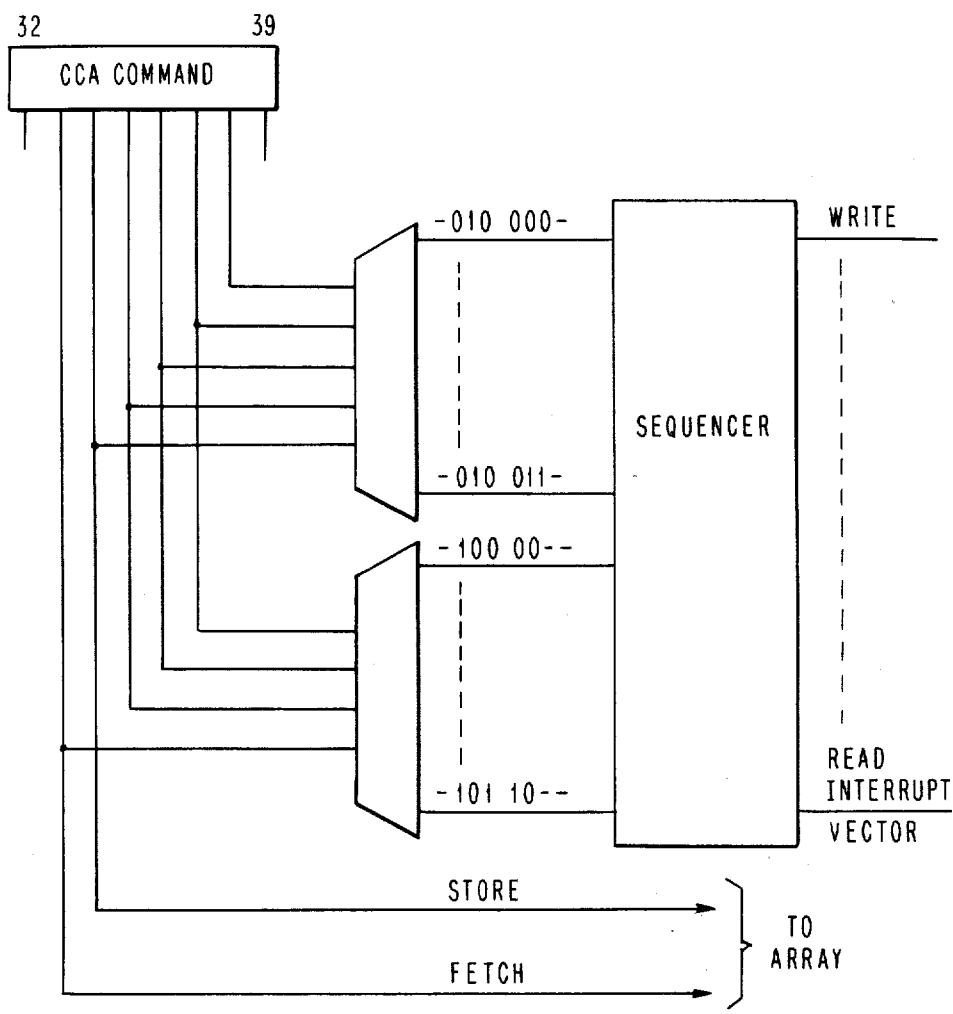
FIG. 4 is a diagram of a command decoder that forms part of the controls for the CCA.

FIG. 4 shows the command byte of the CCIR and the lines from each of the bit positions, 32 through 39. Bits 32 and 39 are unused and are shown in the drawing only as a reference for the other bit positions. The six bit positions 33 through 38 form the command in a partly decoded and partly encoded form. Bits 33 and 34 are non-encoded and identify a fetch operation and a store operation respectively. As is conventional, providing these bits in their non-encoded form makes them available sooner for the operation of beginning a memory accessing cycle, and these signals are sent to the memory, as is conventional. Bits 33 and 34 are also applied to the command decoder circuits where they act as modifiers for bits 35 through 38.

To simplify the explanation, separate functional blocks are shown for the commands that will be called "fetch" commands and for commands that will be called "store" commands. (As will be understood from the description in section 7, a fetch operation that is preceeded by a read and test will be called a fetch type operation.) In the general case illustrated by an address decoder, a decoder that has "n" inputs has 2 to the nth power AND gates that each produce an output on the occurrence of a particular one of the unique combinations of the input variables. In the specific apparatus of the drawing, only a few of the possible codes are used, and in addition, each AND gate receives an enabling input from the fetch or store bit, 33 or 34.

Representative outputs of the decoder are shown in FIG. 4. For example, the code -010 000- is decoded to raise a signal on a line that indicates that an unconditional write operation is to be performed. The next sections of this specification will describe these operations and a following section will describe the apparatus that converts the output of a decoder into a sequence of the primitive operations.

11. CC Operations: Introduction

Table 1 shows the CCA operations and their command codes that are called write operations and it lists in sequence the primitive operations that make up the CCA operation. As has already been mentioned, some of the CCA write operations include primitive read operations.

A sequencer receives the decoder command and produces a signal on a line to perform one of the primitive operations that have been described. Some CC commands are executed by a single primitive operation and some are executed by a sequence of primitive operations. A circuit that steps through a selected sequence of primitive operations can be called a sequencer, and sequences are well known in a variety of forms. For example, a sequence may comprise a counter, a clock to step the counter, and logic circuits responsive to the command and to the counter value to enable a particular output line. The details of the sequencer will be apparent from the following description of the operations. The eight bit command is divided into bits 32 through 39 as follows: 32 (unused), 33 (fetch ((read CCA)), 34 (store, 35, 36 and 37 (fetch/store (write CCA))modifier bits), 38 (unused), and 39 which identifies this byte as a CCA Command Byte. Table 2 similarly shows the CCA Read Operations. Conventional sequencing apparatus is provided for performing these sequences of primitive operations. Commonly, this apparatus comprises a stepping circuit that enables circuits in the predetermined that corresponds to the output of the CCA command decoder.

The CC Operations are identified by the names and the codes that are listed in Table 1. Table 1 also lists reference characters A through P that will be used in other tables to identify the commands. Note that bits 32 and 39 are unused in each command and that bit 38 is also unused for commands K through P. Commands A through J are called Write commands and bits 33, 34=01 to signal a write operation. Conversely, commands K through P are called Read commands and bits 33, 34=10 to signal a read operation.

Tables 2, 3, and 4 list the CC operations and the primitive operations that make up each of them. These tables also have references to the Figs. where these primitive operations are described. In tables 2 and 3, and X signifies that the CC operation of the column heading includes the primitive operation of the row heading. For example, in Table 2 CC operations A through F each include a primitive read operation that was explained in FIG. 2a. The primitive operations are listed in the sequence in which they are performed. For example, in Table 2, CC operation B (Unconditional Write CCA and Signal Channel) includes two steps: first Read CCA, and then Signal Channel. Table 2 shows write operations A through J and Table 3 shows Read operation K through N. Note that the primitive operation Read Channel Entry appears in both tables. Table 4 shows CC operations that involve only a primitive operation that is not in another CC operation.

TABLE 1

| Ref. Char. | Code | Command Name |
|---|---|---|
| A | -010 000- | Unconditional Write CCA |
| B | -010 010- | Unconditional Write CCA and Signal Channel |
| C | -010 100- | Unconditional Write CCA and Set Interrupt Vector Bit |
| D | -010 110- | Write CCA and Signal Channel |
| E | -011 000- | Write CCA and Set Interrupt Vector Bit |
| F | -011 010- | Write CCA and Set Interrupt Vector Bit and Reset Busy Bit |
| G | -011 100- | Set Busy Vector |
| H | -011 110- | Reset Busy Vector |
| I | -010 001- | Unconditional Write Busy Vector |
| J | -010 011- | Unconditional Write Interrupt Vector |
| K | -100 00-- | Read CCA |
| L | -100 01-- | Read CCA and Reset Command |
| M | -100 10-- | Reset Interrupt Vector Bit and Read CCA |
| N | -100 11-- | Reset Interrupt Vector Bit and Read CCA and Reset Command |
| O | -101 00-- | Read Busy Vector |
| P | -101 10-- | Read Interrupt Vector |

TABLE 2

| | CC Operation | | | | | | | |
|---|---|---|---|---|---|---|---|---|
| Primitive Operation | A | B | C | D | E | F | G | H |
| Read Channel Entry | | | | X | X | X | | |
| Test Command Byte | | | | X | X | X | | |

TABLE 2-continued

| Primitive Operation | CC Operation | | | | | | | |
|---|---|---|---|---|---|---|---|---|
| | A | B | C | D | E | F | G | H |
| Write Channel Entry | X | X | X | X | X | X | | |
| Signal Channel | | X | | X | | | | |
| Read Interrupt Vector | | | X | | X | X | | |
| Set Interrupt Bit | | | X | | X | X | | |
| Read Busy Vector | | | | | | X | X | X |
| Reset Busy Bit | | | | | | X | | X |
| Set Busy Bit | | | | | | | X | |

TABLE 3

| Primitive Operation | CC Operation | | | |
|---|---|---|---|---|
| | K | L | M | N |
| Read Interrupt Vector | | | X | X |
| Reset Interrupt Bit | | | X | X |
| Read Channel Entry | X | X | X | X |
| Reset Command Byte | | X | | X |

TABLE 4

| Primitive Operation | CC Operation |
|---|---|
| Read Busy Vector | O |
| Read Interrupt Vector | P |
| Reset Busy Vector | I |
| Reset Interrupt Vector | J |

12. CC Operation—An Example

Suppose that the IOP issues a command write CCA and Signal Channel (Command D in FIG. 1). As in FIG. 2b, the message that is loaded into the CCIR contains the ID of the channel and bytes 0-2 contain the message that is to be loaded into the array and later fetched by the channel. As the sequence in column D of Table 2 shows, the channel entry is read as in FIG. 2a and the command byte is tested as in FIG. 2c. If the command byte is all zeros, the entry from the CCIR is entered into the addressed array location. A two byte message on bus 26 is then sent to the designated channel to signal the channel to access this message. If the command byte is not all zeros, the operation is terminated without writing the channel entry and an appropriate response is issued to the IOP signalling it of this fact.

At some later time, the channel issues the command Read Channel Entry and Reset Command (column L in Table 3). The CC performs a read operation of FIG. 2a and loads the message onto the bus 25 of FIG. 1 to the address channel. The command byte is set to all zeros. Ordinarily, the message to the channel starts a channel operation. When the channel begins its operation, it issues the command Set Busy Vector (column G in Table 2). The CC reads the appropriate half of the Busy Vector and uses the channel ID to set one bit to a logical one as is described in FIG. 2c. (When the channel has completed the operation, it resets the Busy Bit as will be explained later.)

To begin another operation with the same channel, the IOP issues the command Read Busy Vector (reference character 0 in Table 4). If the channel is not busy, the IOP can begin another operation in the way that has been described. If the channel is busy, the IOP may select a channel that is not busy to perform this operation or it may wait until the channel is not busy.

When the channel has completed its operation, it issues the command Write CCA and Set Interrupt Vector bit and reset Busy Bit (column F in Table 2). Bytes 0-2 of this message may contain associated information for the interrupt, and byte 6 is a status byte. When this operation occurs, an interrupt signal is sent to the IOP. In response to this command from the channel, the CC reads the channel entry and performs the test for all zeros in byte 3. If byte 3 is all zero bits, the message from the channel is written into channel entry location of the array, the interrupt bit is set and the busy bit is reset. These operations are performed in the sequence that is shown in column F of Table 2. If a command byte is not all zeros, the channel is signalled and these operations do not take place.

Later, in response to the interrupt signal, the IOP issues a command read interrupt vector (P in Table 2). The IOP receives the 32 bit interrupt vector from the CC and it makes a test to determine which channel or channels are requesting an interrupt. The IOP clears the interrupt by the command read channel entry and reset interrupt vector and reset command. (Column N in Table 3).

13. Channel to Channel Communications—FIG. 2D

So far, the description has been directed to communications from a channel to the IOP or from the IOP to a channel. The CC can also be used for communications between channels. These operations can be understood from the standpoint that the sending channel performs operations that otherwise have been performed only by the IOP. For this operation, the message that the sending channel loads into the CCIR has the channel ID of the receiving channel in byte position 0. Ordinarily it will be undesirable for one channel to overwrite a previous message in the CCA for another channel, and the channel to channel write operation is identical to the operation write CCA and signal channel (column D of Table 2). Preferably the address of the channel ID of the sending channel is included in the CCIR in bit byte position 5. If the write operation does not complete because the channel entry contains an earlier unread message, the sending channel is signalled by means of this byte 5 channel ID.

14. Other Embodiments

From this description, those skilled in the art will recognize a variety of applications of the invention and modifications within the spirit of the invention and the scope of the claims.

Having thus described our invention, what we claim as new, and desired to secure by Letters Patent is:

1. In a data processing system having a channel subsystem including (1) a plurality of channels for transmitting data between I/O devices and a central processor store, (2) a processor IOP for controlling certain operations of the channels, (3) and an input bus and an output bus interconnecting the channels and the IOP and the central processor store for these operations, a channel communicator for communications between the IOP and the channels, comprising, a storage array having a multi-byte word location for each channel in the subsystem, an input register and an output register for the array, address means for accessing a word location in the array, and means for performing store and fetch operations, means connecting said input register to receive a message from said input bus and connecting said output register to place a message on said output bus, means in said channels and in said IOP for sending to said input register via said input bus a message containing a channel ID identifying the channel that the message is addressed to or is from, a command to be executed by the channel communicator, and byte positions for data to be stored in said array on the execution of certain commands, means in said channel communicator for supplying address bits from the channel ID of a message to said address means for accessing a word location holding an entry for the channel identified in the channel ID, and means for executing commands for fetching data from a channel entry of the array, commands for storing data in a channel entry of the array and commands for both fetching and storing data in a channel entry of the array.

2. The channel communicator of claim 1 wherein said means for executing said storing commands includes means for storing a data portion of a message in the word location for a selected channel and means for signaling said selected channel that data has been stored.

3. The channel communicator of claim 2 wherein said means for executing said fetching commands comprises, means for fetching a channel entry from a selected word location and transmitting the entry to the IOP, and means for then setting a predetermined field of said word location of the array to a predetermined code.

4. The channel communicator of claim 3, wherein said means for executing said fetching and storing commands comprises, means for fetching a channel entry from a selected word location of the array, means for testing said predetermined field of said entry, and means for storing a new entry in said location only if said field contains said predetermined code.

5. The channel communicator of claim 1 wherein said storage array has a further plurality of multi-byte storage for storing vectors each having a bit for each channel and wherein said means for executing said commands comprises means for supplying address bits to said addresses means to access one of said channel entries on some of said commands and to access one of said vectors on other of said commands.

6. The channel communicator of claim 5 wherein said means for executing said commands includes means for accessing vectors designated an interrupt vector and a busy vector on different ones of said other commands.

7. The channel communicator of claim 6 wherein said means for executing said command comprises means for testing a bit position of a vector and means for setting a bit position of a vector according to the channel ID and the command of a message.

8. The channel communicator of claim 7 wherein said means for executing said fetching commands comprises, means for fetching a channel entry from a selected word location and transmitting the entry to the IOP, and means for then setting a predetermined field of said word location of the array to a predetermined code.

9. The channel communicator of claim 8 wherein said means for executing said fetching and storing commands comprises, means for fetching a channel entry from the array, means for testing said predetermined field of said entry, means for storing a new entry in said location only if said field contains said code, and means for setting the bit in the interrupt vector and resetting the bit in the busy vector according to the channel ID.

10. The channel communicator of claim 9 including means for communications between channels comprising, means in a channel for placing the ID of an addressed channel into a message field otherwise reserved for data and, means in said executing means for testing the entry for the addressed channel for said code and if said entry contains said code, placing the data portion of the message in said entry and signaling said addressed channel.

* * * * *